United States Patent
Lapeer et al.

(10) Patent No.: US 9,862,360 B2
(45) Date of Patent: Jan. 9, 2018

(54) CONTROL DEVICE FOR VEHICLE AND METHOD FOR CARWASH PREPARATION

(71) Applicant: DENSO International America, Inc., Southfield, MI (US)

(72) Inventors: Ryan Lapeer, Farmington Hills, MI (US); Michael Chachich, Wixom, MI (US)

(73) Assignee: DENSO International America, Inc., Southfield, MI (US)

( * ) Notice: Subject to any disclaimer, the term of this patent is extended or adjusted under 35 U.S.C. 154(b) by 45 days.

(21) Appl. No.: 14/735,424

(22) Filed: Jun. 10, 2015

(65) Prior Publication Data
US 2016/0362089 A1   Dec. 15, 2016

(51) Int. Cl.
*B08B 3/02* (2006.01)
*B60S 3/04* (2006.01)
*B60K 6/00* (2006.01)
*G05D 1/00* (2006.01)

(52) U.S. Cl.
CPC ............... *B60S 3/04* (2013.01); *B08B 3/022* (2013.01); *B60K 6/00* (2013.01)

(58) Field of Classification Search
CPC .... G05D 1/00; B61D 1/00; B08B 3/00; B08B 3/02; B60S 3/04
USPC ........................................................ 701/408
See application file for complete search history.

(56) References Cited

U.S. PATENT DOCUMENTS

| 5,521,442 | A | * | 5/1996 | Butterfield | H01Q 1/10 307/10.1 |
|---|---|---|---|---|---|
| 5,886,648 | A | * | 3/1999 | McElroy | B60S 3/04 134/123 |
| 6,147,625 | A | * | 11/2000 | Decker | B60S 3/04 134/123 |
| 2006/0180647 | A1 | * | 8/2006 | Hansen | B60S 3/00 235/375 |
| 2008/0127436 | A1 | * | 6/2008 | MacDowell | B60S 3/04 15/97.3 |
| 2012/0253973 | A1 | * | 10/2012 | Harter | H04W 4/023 705/26.9 |
| 2016/0244029 | A1 | * | 8/2016 | Weston | B60T 7/12 |
| 2017/0072908 | A1 | * | 3/2017 | Liubakka | B60R 25/23 |

FOREIGN PATENT DOCUMENTS

JP          H1-314649 A    12/1989

* cited by examiner

*Primary Examiner* — Tan Q Nguyen

(57) ABSTRACT

A position determination unit determines whether a position of the vehicle is in proximity to a carwash. A shift determination unit determines a shift position of a transmission device of the vehicle. A brake determination unit determines activation of a brake device of the vehicle. A control unit determines that a condition to implement a carwash preparation is satisfied when the position determination unit determines that the position of the vehicle is in proximity to the carwash, when the shift determination unit determines that the shift position is in a neutral position, and when the brake determination unit determines that the brake device is deactivated.

7 Claims, 14 Drawing Sheets

US 9,862,360 B2

CONTROL DEVICE FOR VEHICLE AND METHOD FOR CARWASH PREPARATION

TECHNICAL FIELD

The present disclosure relates to a control device for a vehicle. The present disclosure further relates to a method for carwash preparation.

BACKGROUND

Conventionally, a carwash facility may have a conveyer to convey a vehicle through the carwash. Before entry of a carwash, a vehicle may need preparation for carwash such as manipulation of devices of the vehicle. An occupant of the vehicle may forget the preparation in advance of carwash.

SUMMARY

The present disclosure may address the above-described concerns.

According to an aspect of the preset disclosure, a control device is for a vehicle. The control device comprises a position determination unit configured to determine whether a position of the vehicle is in proximity to a carwash. The control device further comprises a shift determination unit configured to determine a shift position of a transmission device of the vehicle. The control device further comprises a brake determination unit configured to determine activation of a brake device of the vehicle. The control device further comprises a control unit. The control unit is configured to determine that a condition to implement a carwash preparation is satisfied when the position determination unit determines that the position of the vehicle is in proximity to the carwash, when the shift determination unit determines that the shift position is in a neutral position, and when the brake determination unit determines that the brake device is deactivated.

According to another aspect of the preset disclosure, a method is for carwash preparation. The method comprises determining whether a position of the vehicle is in proximity to a carwash. The method further comprises determining a shift position of a transmission device of the vehicle. The method further comprises determining activation of a brake device of the vehicle. The method further comprises determining that a condition to implement a carwash preparation is satisfied when determining that the position of the vehicle is in proximity to the carwash, when determining that the shift position is in a neutral position, and when determining that the brake device is deactivated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
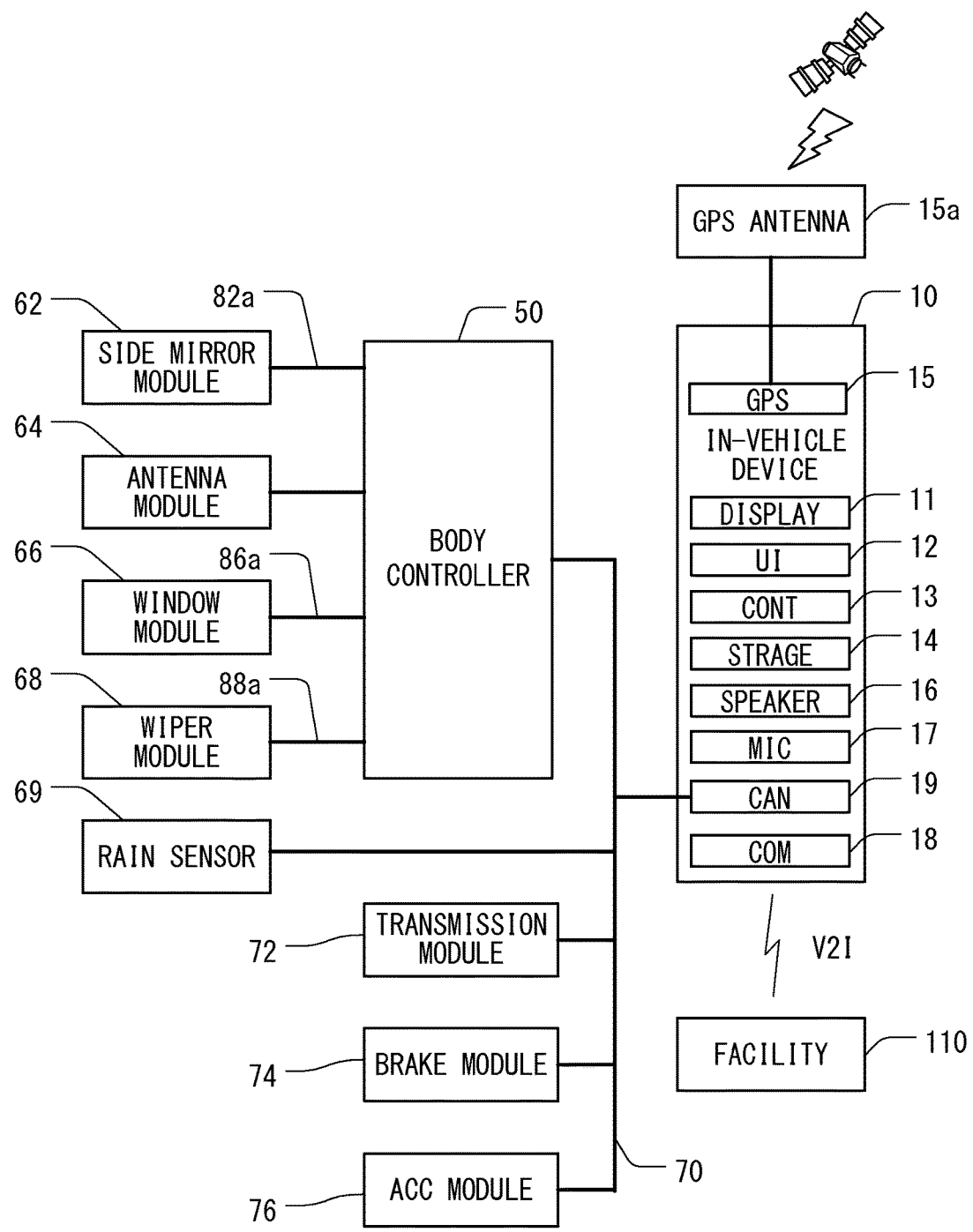
FIG. 1 is a block diagram showing a control device for a vehicle.

FIG. 1 shows an example of a control device for a vehicle. The control device may include an in-vehicle device 10 and a body controller 50. The in-vehicle device 10 is, for example, a car-mounted navigation device such as a head unit. The in-vehicle device 10 is equipped with components such as a display 11, a user interface 12, a controller 13, a storage device 14, a GPS device 15 (global positioning system) device 15, a speaker 16, a microphone 17, and/or the like. The components of the in-vehicle device 10 may be data-linked with each other via an internal communication bus. The display 11 is a color dot matrix screen such as a liquid crystal display (LCD) or an organic electroluminescence (O-EL) device. The display 11 indicates a color image. The user interface 12 is an input device such as a mechanical switch or a touch screen equipped on the display 11. The user interface 12 receives entry of information from a user and transmits signals to the controller 13 corresponding to the entered information. The controller 13 is a microcomputer including a CPU, a RAM, a ROM, an I/O device, and/or the like. The storage device 14 is, for example, a solid state drive and/or a hard disk drive. The storage device 14 is configured to store various data such as map data and/or guidance information. The GPS device 15 is configured to communicate with a satellite navigation system and to retrieve various information such as coordinates of the vehicle. The speaker 16 outputs audible information, such as voice, for implementing a guidance operation along a route to a destination. The microphone 17 receives user's voice and may accept user's voice instruction.

The in-vehicle device 10 is further equipped with a communicator 18. The communicator 18 may be a wireless communication device in compliance with a wireless technology standard to enable vehicle to infrastructure (V2I) communications. The communicator 18 may be configured to communicate with an infrastructure device such as a communication device installed in a facility 110. The facility 110 may be a carwash 100.

The in-vehicle device 10 is configured to perform route navigation. Specifically, the in-vehicle device 10 shows a map image on the display 11 and a route toward a destination on the map image thereby to guide a user (driver) toward a destination.

The in-vehicle device 10 is further equipped with a CAN device 19 connected with the body controller 50 via a controller area network (CAN) 70. The body controller 50 may be an electronic control unit including a microcomputer having a CPU, a RAM, a ROM, an I/O device, and/or the like. The body controller 50 is further connected with a transmission module 72, a brake module 74, an accelerator module 76, a rain sensor 69, and/or the like.

The CAN 70 may be a multiplex communication network to conduct duplex electronic signals. The transmission module 72 may include a transmission controller for a transmission device of the vehicle and a transmission sensor for detecting a shift position of the transmission device. The transmission device may be an automatic transmission device being widely used. The shift position of the transmission device may be selectable from various shift positions such as Park (P), Reverse (R), Neutral (N), Drive (D), Third (3), Second (2), and First (1). When the shift position is at the Neutral (N: neutral position), all gear trains may be disengaged from each other in the transmission. Thus, the transmission device may permit the vehicle to coast freely, without motive force from an engine of the vehicle.

The brake module 74 may include a brake controller for a brake device of the vehicle and a brake sensor for detecting a position of a brake device of the brake device. The brake device may be a brake pedal and/or a parking brake. The accelerator module 76 may include an accelerator controller for an accelerator device of the vehicle and an accelerator sensor for detecting a position of an accelerator pedal of the accelerator device. The rain sensor 69 is configured to detect precipitation on the vehicle, such as rainfall.

The body controller 50 is configured to exchange electronic signals with the in-vehicle device 10, the transmission module 72, the brake module 74, the accelerator module 76, and the rain sensor 69.

The body controller 50 is further connected with a side mirror module 62, an antenna module 64, a window module 66, and a wiper module 68 via individual control lines 82a, 84a, 86a, and 88a. Each of the control lines 82a, 84a, 86a, and 88a may be an electric wire to conduct an electric signal such as a voltage signal.

The side mirror module 62 may include a side mirror controller for a side mirror of the vehicle. The side mirror controller may include an electric motor to drive the side mirror to fold the side mirror and to unfold the side mirror.

The antenna module 64 may include an antenna controller for an antenna of the vehicle. The antenna controller may include an electric motor to drive the antenna. The electric motor may rewind a wire of the antenna to lower the antenna and may release the rewound wire to raise the antenna.

The window module 66 may include a window controller for a window of the vehicle. The window controller may include an electric motor to drive the window. The electric motor may rewind a wire of the window to lower the window and may release the rewound wire to raise the window. The window module 66 may be configured to independently control each window of a driver and a passenger.

The wiper module 68 may include a wiper controller for a wiper of the vehicle. The wiper controller may include an electric motor to drive the wiper. The wiper controller may be controlled by the body controller 50. Specifically, the body controller 50 may retrieve a detection signal representing precipitation such as a rainy state from the rain sensor 69. When the body controller 50 determines precipitation according to the detection signal from the rain sensor 69, the body controller 50 may instruct the wiper controller to activate the wiper, when an automatic wiper mode is set. The automatic wiper mode may be cancelled by a user or by a program executed by the body controller 50. The wiper module 68 may be configured to independently control each wiper of a windshield and a rear window.

The in-vehicle device may store point of interest (POI) in the storage device 14. The POI may include various landmarks such as a carwash, a gas station, a restaurant, and the like. The in-vehicle device may figure out POIs around the vehicle and may cause the display 11 to indicate the POIs in addition to a position of the vehicle.

Figure 2:
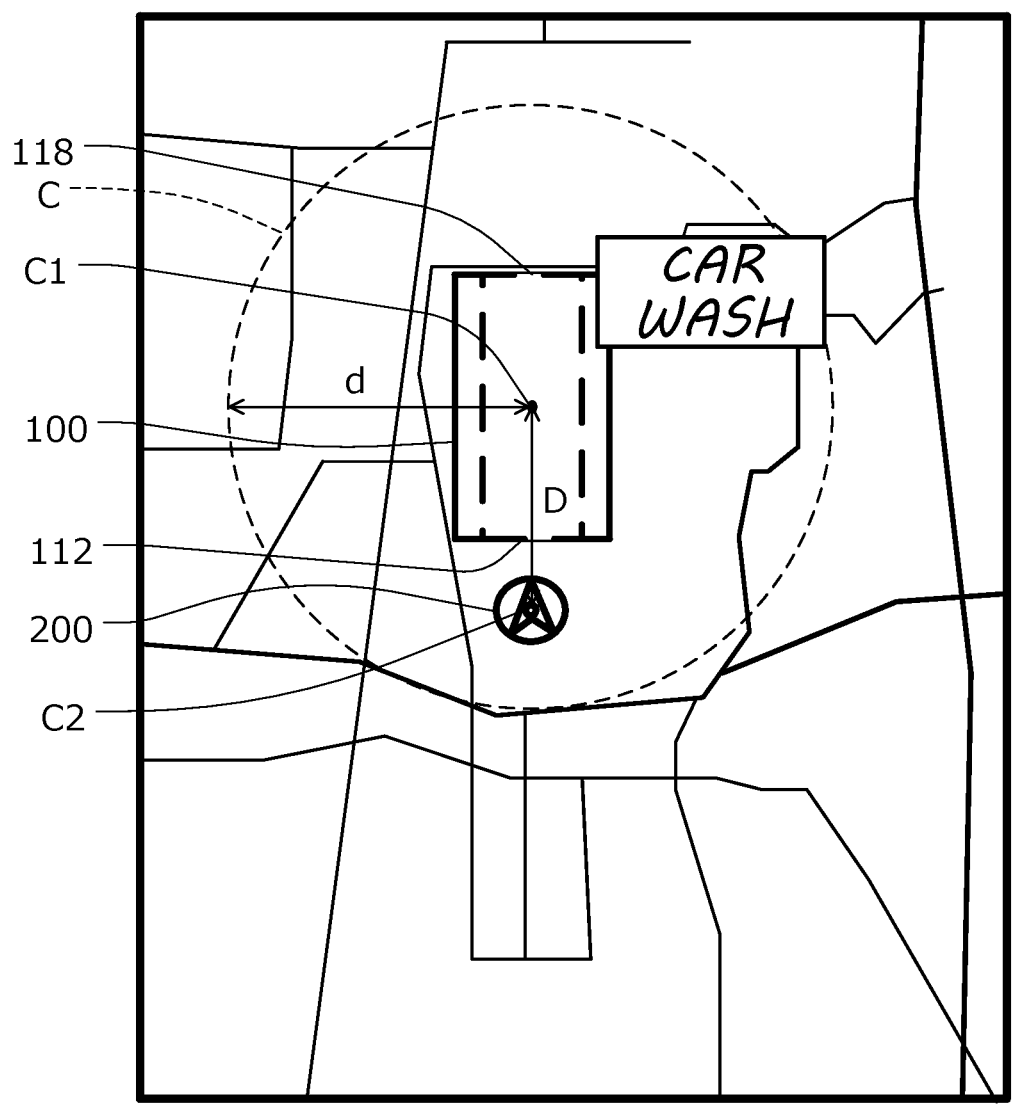
FIG. 2 is a view shown on a display device before carwash.

In FIG. 2, the vehicle 200 is in proximity to a carwash 100. Specifically, the in-vehicle device 10 may determine whether the vehicle 200 is within a predetermined distance d from the carwash 100, as defined by a circle C. More specifically, the in-vehicle device 10 may determine whether a present distance D between a center C1 of the carwash 100 and a center C2 of the vehicle 200 is less than the predetermined distance d. The predetermined distance d may be determined in consideration of an accuracy of the GPS device 15. The predetermined distance d may be, for example, 8 meters. When determining that the present distance D is less than the distance d, the in-vehicle device 10 determines that the vehicle 200 is in proximity to the carwash 100. A periphery of the carwash 100 may be used instead of the center C1 of the carwash 100. A periphery of the vehicle 200 may be used instead of the center C2 of the vehicle 200.

Figure 3:
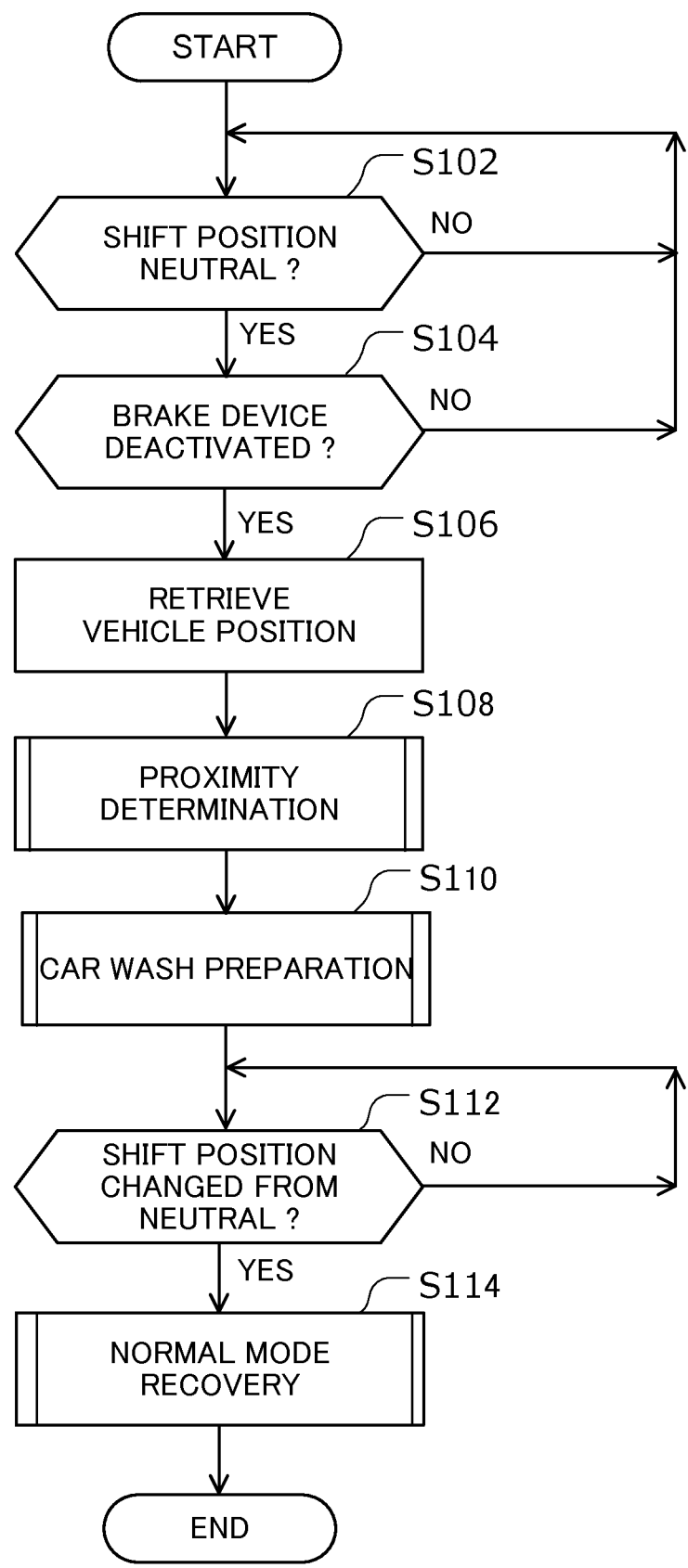
FIG. 3 is a flowchart showing a main processing.

FIG. 3 shows a main processing. The main processing may be a program product stored in the storage device 14 of the in-vehicle device 10. The controller 13 of the in-vehicle device 10 may execute the main processing at a constant interval such as 1 second.

At S102, the in-vehicle device 10 retrieves a shift position of the transmission device from the transmission module 72. The shift position may be one of Park (P), Reverse (R), Neutral (N), Drive (D), Third (3), Second (2), and First (1). When the in-vehicle device 10 determines that the shift position is the Neutral (N), S102 makes a positive determination.

At S104, the in-vehicle device 10 retrieves the brake signal from the brake module 74. The in-vehicle device 10 further determines whether the brake device is deactivated to permit the vehicle 200 to move, based on the brake signal. The brake device may be activated to immobilize the vehicle 200, when the driver depresses the brake pedal and/or when the driver pulls a parking brake lever. Alternatively, the brake device may be deactivated to permit the vehicle 200 to move, when the driver releases the brake pedal and when the driver releases the parking brake lever. When the in-vehicle device 10 determines that the brake device is deactivated, S104 makes a positive determination.

At S106, the in-vehicle device 10 retrieves the position of the vehicle according to the GPS signal from the GPS device 15.

Figure 4:
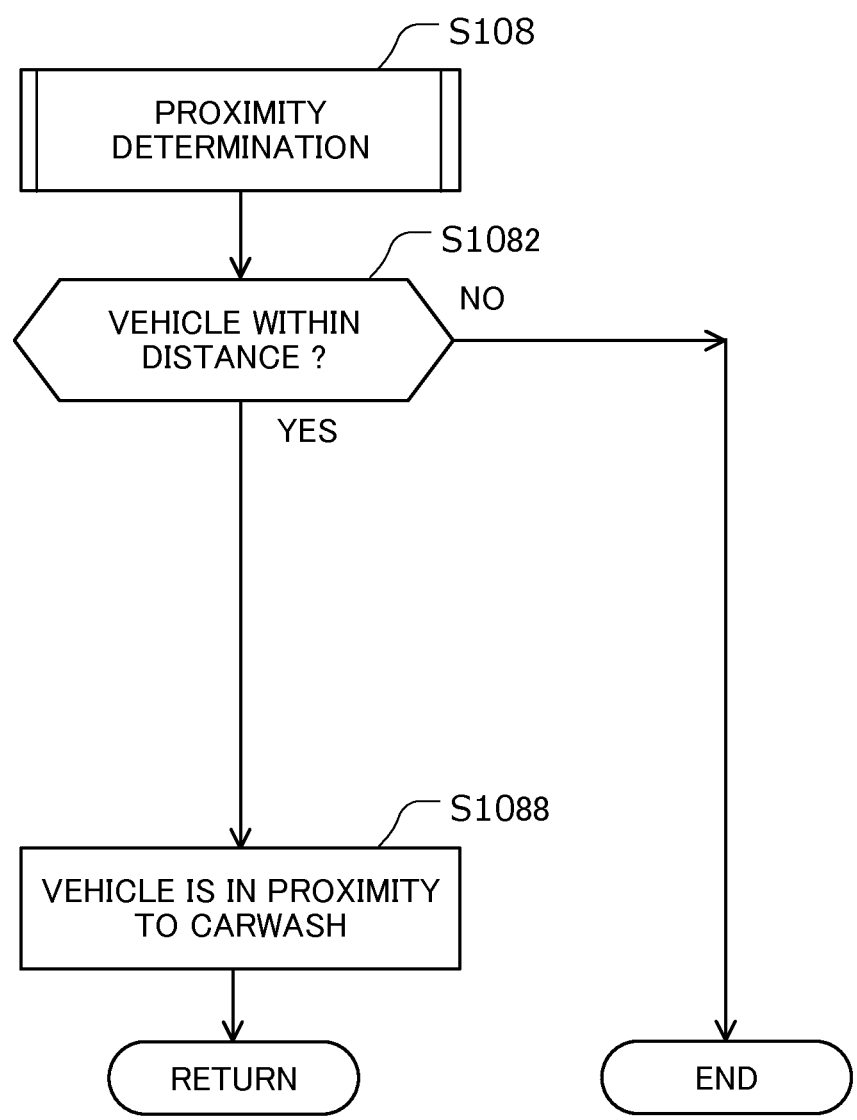
FIG. 4 is a flowchart showing a proximity determination.

At S108, the in-vehicle device 10 implements a proximity determination. Specifically, as shown in FIG. 4, the proximity determination is a sub-processing branched from the main processing. In the proximity determination, at S1082, the in-vehicle device 10 determines whether the present distance D between the vehicle 200 and the carwash 100 is within (less than) the predetermined distance d. When the in-vehicle device 10 determines that the present distance D is within the predetermined distance d, S1082 makes a positive determination. Consequently, at S1088 the in-vehicle device 10 determines that the vehicle 200 is in proximity to the carwash 100. Thus, the sub-processing returns to the main processing in FIG. 3. When S1082 makes a negative determination, the sub-processing terminates without returning to the main processing.

Figure 5:
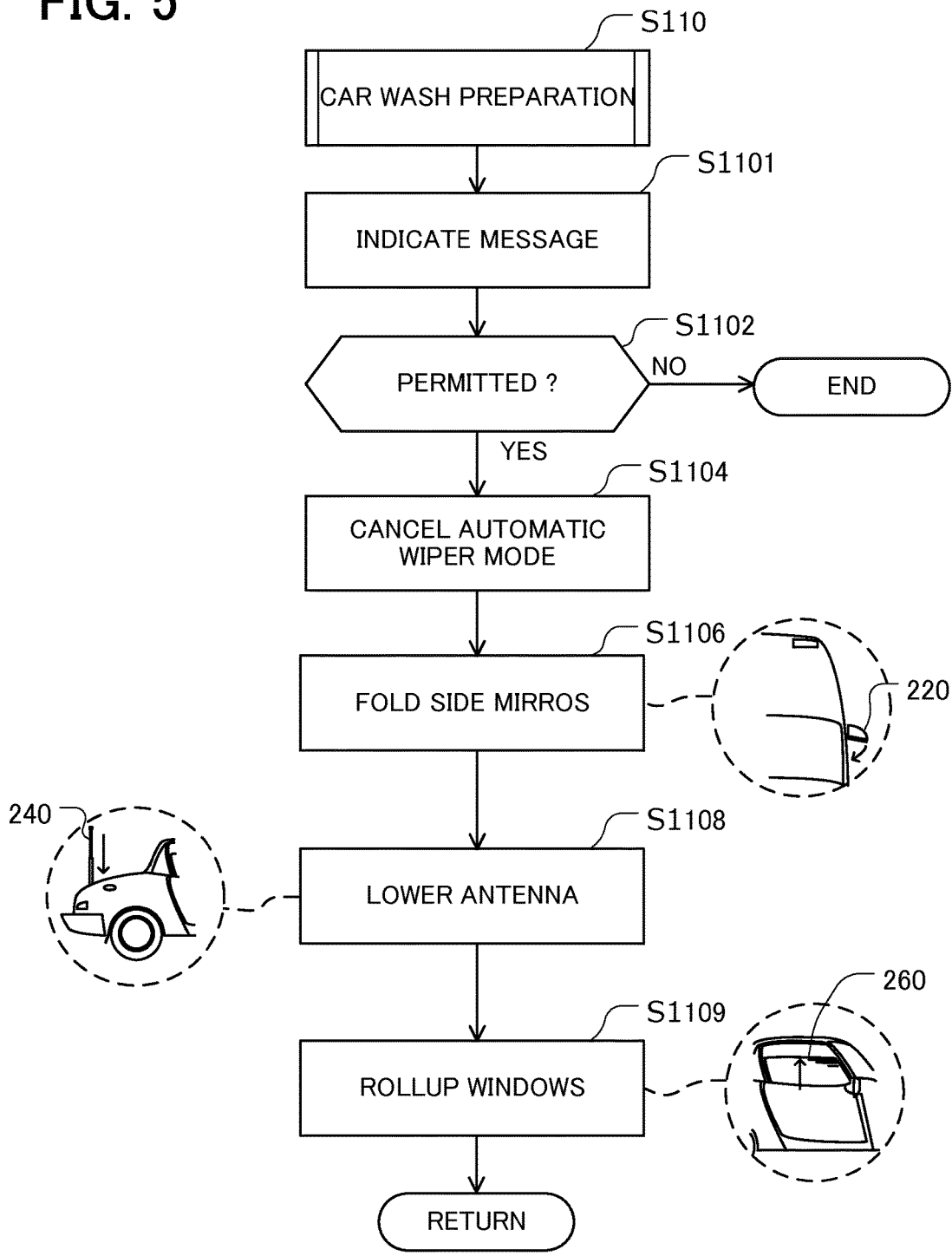
FIG. 5 is a flowchart showing a carwash preparation.

In the main processing in FIG. 3, at S110, the in-vehicle device 10 implements a carwash preparation. As shown in FIG. 5, the carwash preparation is a sub-processing branched from the main processing. In the carwash preparation, at S1101, the in-vehicle device 10 may prompt an occupant such as the driver to start a substantial operation of the carwash preparation.

Figure 6:
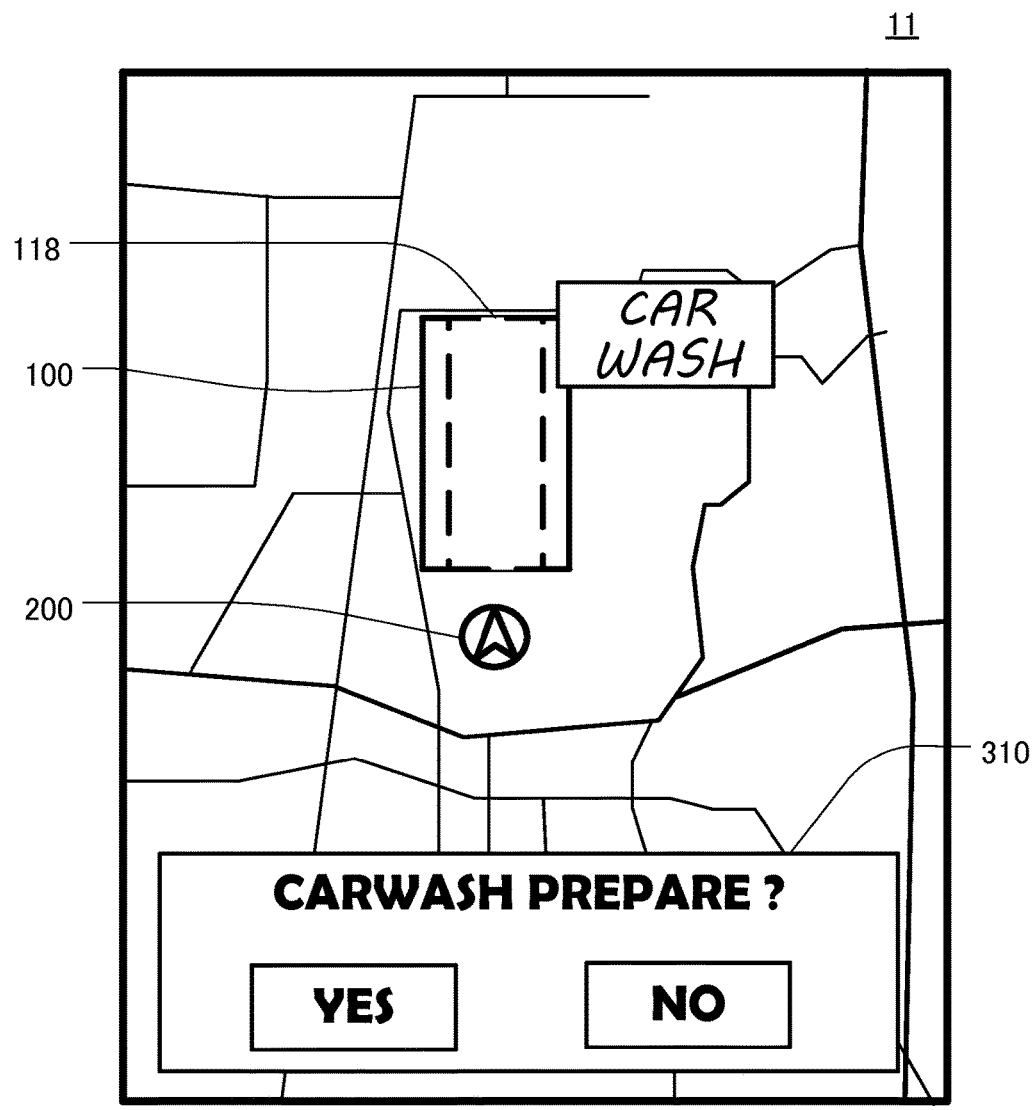
FIG. 6 is a view shown on a display device before carwash.

Specifically, as shown in FIG. 6, the in-vehicle device 10 may indicate a message 310 on the display 11 to ask the driver whether to start the carwash preparation. When the occupant selects "NO" by touching a NO button, the carwash preparation terminates. When the occupant selects "YES" by touching a YES button, S1102 in FIG. 5 makes a positive determination. The in-vehicle device 10 may show this indication together with activation of the speaker to utter a voice message. The in-vehicle device 10 may obtain the response from the occupant by receiving a voice command from the occupant with the microphone.

At S1104, the in-vehicle device 10 instructs the body controller 50 to cancel the automatic wiper mode. Therefore, the body controller 50 does not instruct the wiper module 68 to activate the wiper in response to detection of rain by the rain sensor 69, during the automatic wiper mode is cancelled. That is, the wiper module 68 may be restricted from activating the wiper even when the rain sensor 69 detects spray of cleaning liquid in the carwash 100. At S1106, the in-vehicle device 10 instructs the body controller 50 to cause the side mirror module 62 to fold the side mirror 220 of the vehicle 200. In response, the side mirror module 62 activates its electric motor to drive the side mirror 220 toward the body side, if the side mirror 220 is unfolded.

At S1108, the in-vehicle device 10 instructs the body controller 50 to cause the antenna module 64 to lower the antenna 240 of the vehicle 200. In response, the antenna module 64 activates its electric motor to lower the antenna 240 thereby to retract the antenna 240 into the body of the vehicle 200, if the antenna 240 is raised. The antenna module 64 may fold the antenna 240 toward the body of the vehicle 200 if the antenna 240 has a swinging configuration.

At S1109, the in-vehicle device 10 instructs the body controller 50 to cause the window module 66 to rollup a window 260 of the vehicle 200. In response, the window module 66 activates its electric motor to rollup the window 260 thereby to raise the window 260 and to close the window 260, if the window 260 is opened. Thus, the sub-processing returns to the main processing in FIG. 3.

Figure 7:
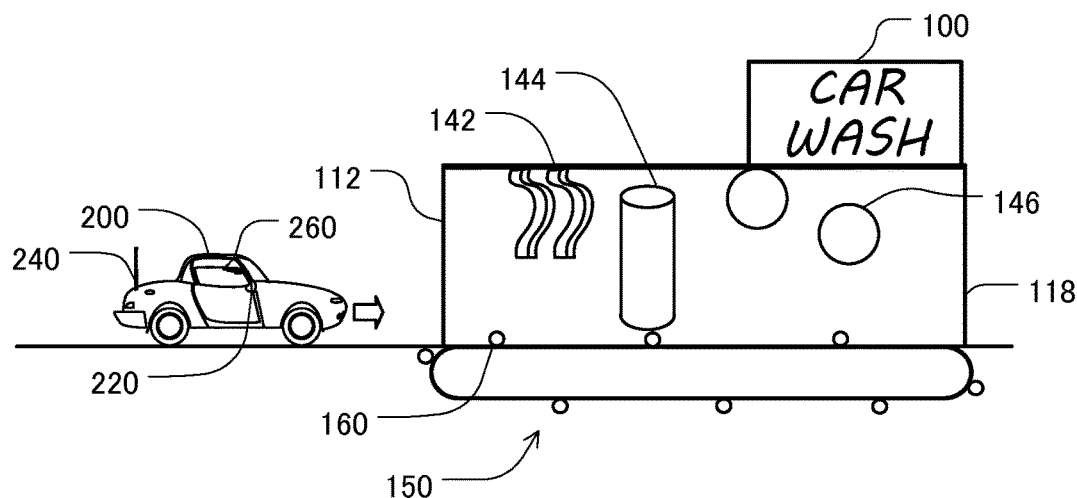
FIGS. 7 to 12 are schematic views showing a process of carwash.

FIG. 7 shows a state where the vehicle 200 is in front of the entrance 112 of the carwash 100. The carwash 100 is a tunnel equipped with a conveyer 150 in its underground. The conveyer 150 has multiple rollers 160. The conveyer 150 has a driving system such as a motor and a belt to drive the rollers 160 thereby to move the rollers 160 along the conveyer 150. The carwash 100 accommodates strips 142, side brushes 144, and upper brushes 146 to clean the vehicle 200.

Figure 8:
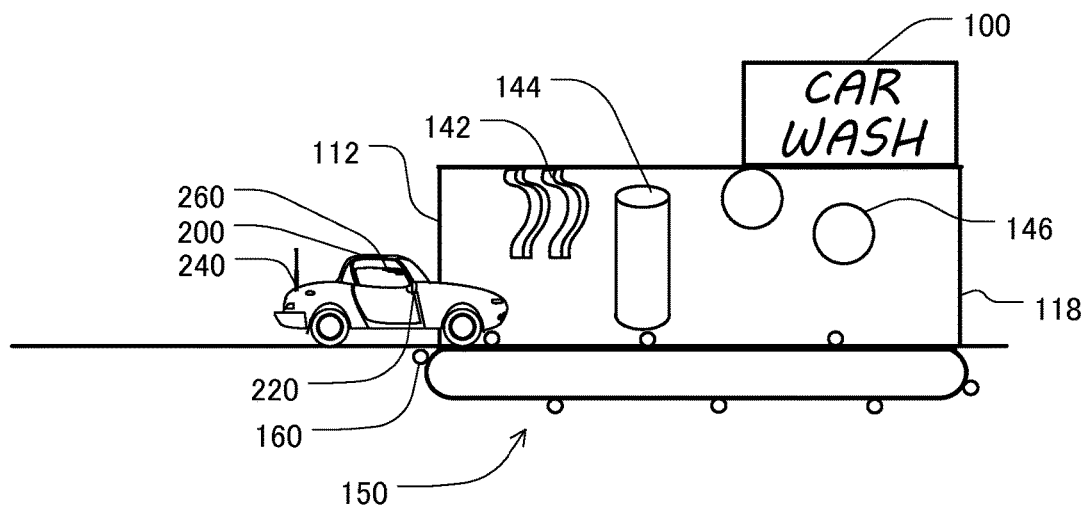

FIG. 8 shows a state where the driver moves the vehicle 200 through the entrance 112 into the carwash 100. The present state is before implementation of the carwash preparation. Front wheels of the vehicle 200 may be on the conveyer 150 and may be ready to be conveyed by the roller 160. The driver may be instructed by a shop assistant to manipulate the shift knob at the Neutral (N) thereby to set the shift position at the Neutral (N). In response, the driver may set the shift position at the Neutral (N). Thus, step S102 in FIG. 3 makes a positive determination. Further, the driver may deactivate the brake device. Thus, step S104 in FIG. 3 makes a positive determination. Currently, the vehicle 200 is enabled to move freely. Presently, the side mirror 220 is unfolded, the antenna 240 is raised, and the window 260 is opened. As described above, the driver may be prompted to start the carwash preparation.

Figure 9:
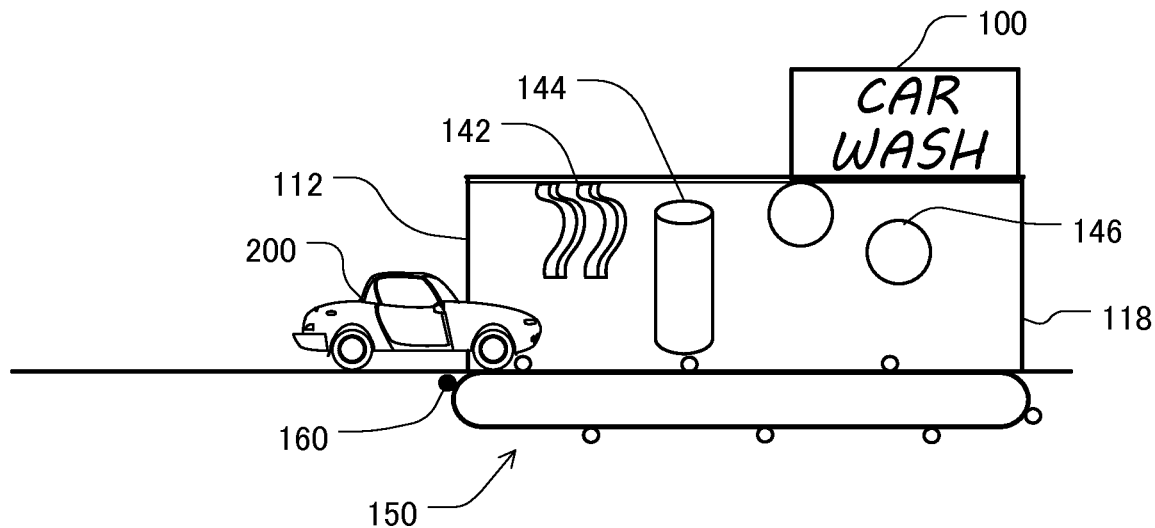

FIG. 9 shows a state after implementation of the carwash preparation. The side mirror 220 is folded, the antenna 240 is lowered, and the window 260 is rolled up (closed). Thus, the vehicle 200 is ready to be pulled into the carwash 100. The conveyer 150 is activated to move the rollers 160. The roller 160 marked in FIG. 9 is moved toward the rear side of the front wheels of the vehicle 200.

Figure 10:
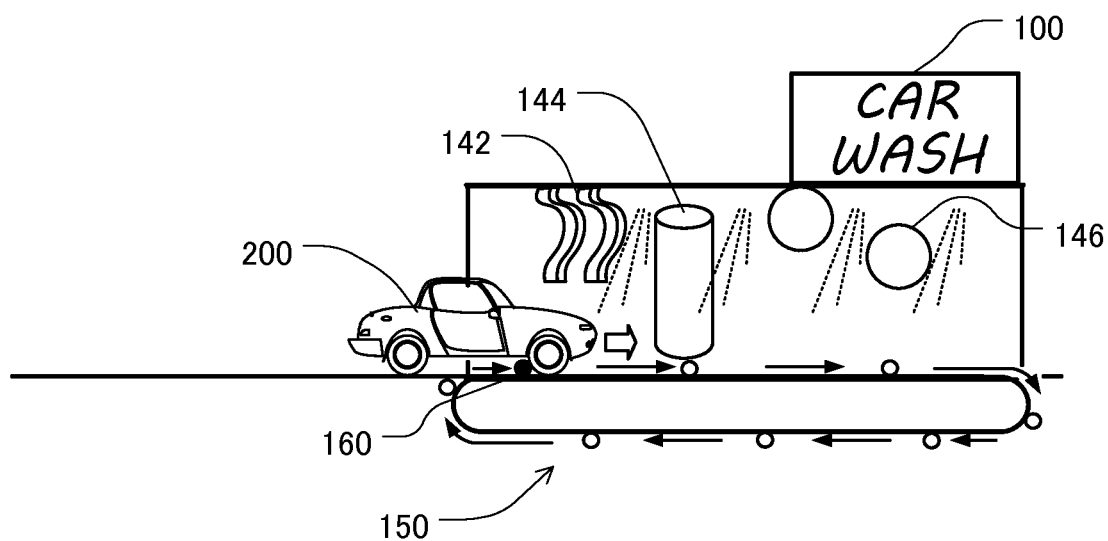

Thus, as shown in FIG. 10, the roller 160 makes contact with the rear side of the front wheels of the vehicle 200. The conveyer 150 continues to drive the roller 160 to push the front wheels of the vehicle 200. In the present state, the shift position of the vehicle 200 is at the Neutral (N). Therefore, all gear trains of the transmission may be disengaged from each other. The transmission device may permit the vehicle 200 to coast freely. Thus, the vehicle 200 is pushed by the roller 160 forward into the carwash 100, as being conveyed on the conveyer 150. The carwash 100 starts spraying cleaning liquid onto the vehicle 200 and starts driving the side brushes 144 and the upper brushes 146.

Figure 11:
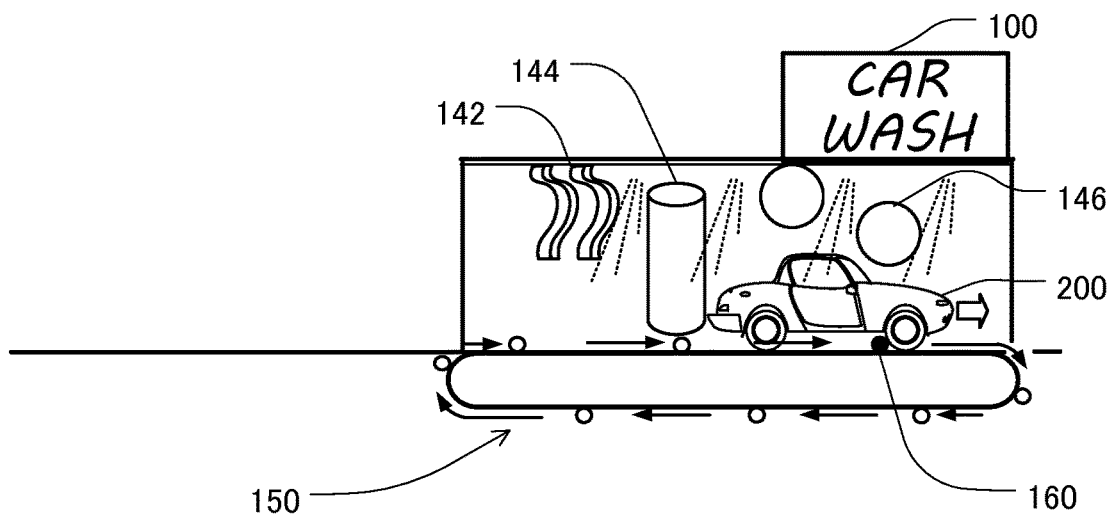

As shown in FIG. 11, as the roller 160 further moves forward through the carwash 100 toward the exit 118, the vehicle 200 is moved by the roller 160 through the carwash 100 while being scrubbed with the strips 142, the side brushes 144, and the upper brushes 146.

Figure 12:
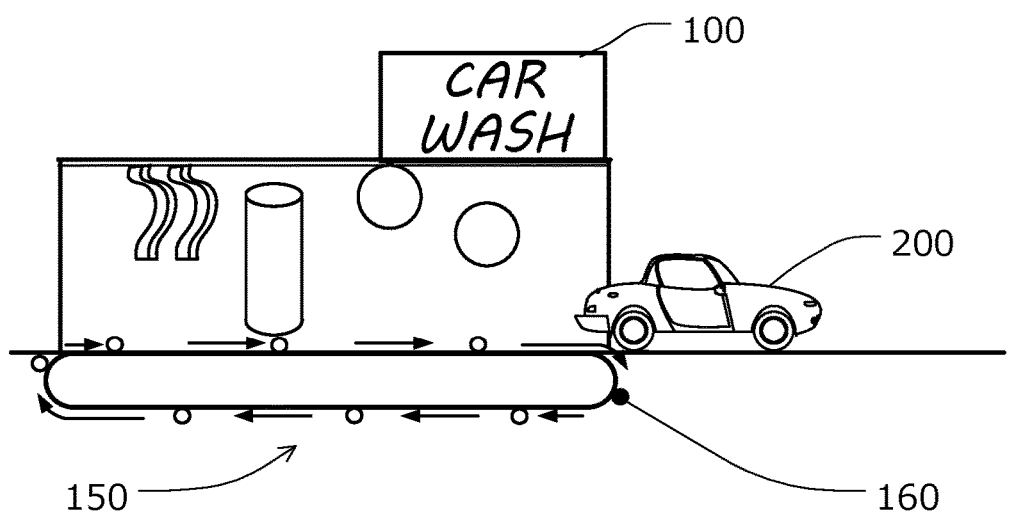

As shown in FIG. 12, the vehicle 200 is finally moved out of the carwash 100 through the exit 118. The carwash 100 may deactivate the conveyer 150, the spray, the side brushes 144, and the upper brushes 146. Thus, the driver may manipulate the shift knob from the Neutral (N) to another position such as the Drive (D) to move the vehicle 200 away from the carwash 100.

In response, S112 in FIG. 3 makes a positive determination. At S114, the in-vehicle device 10 implements normal mode recovery.

Figure 13:
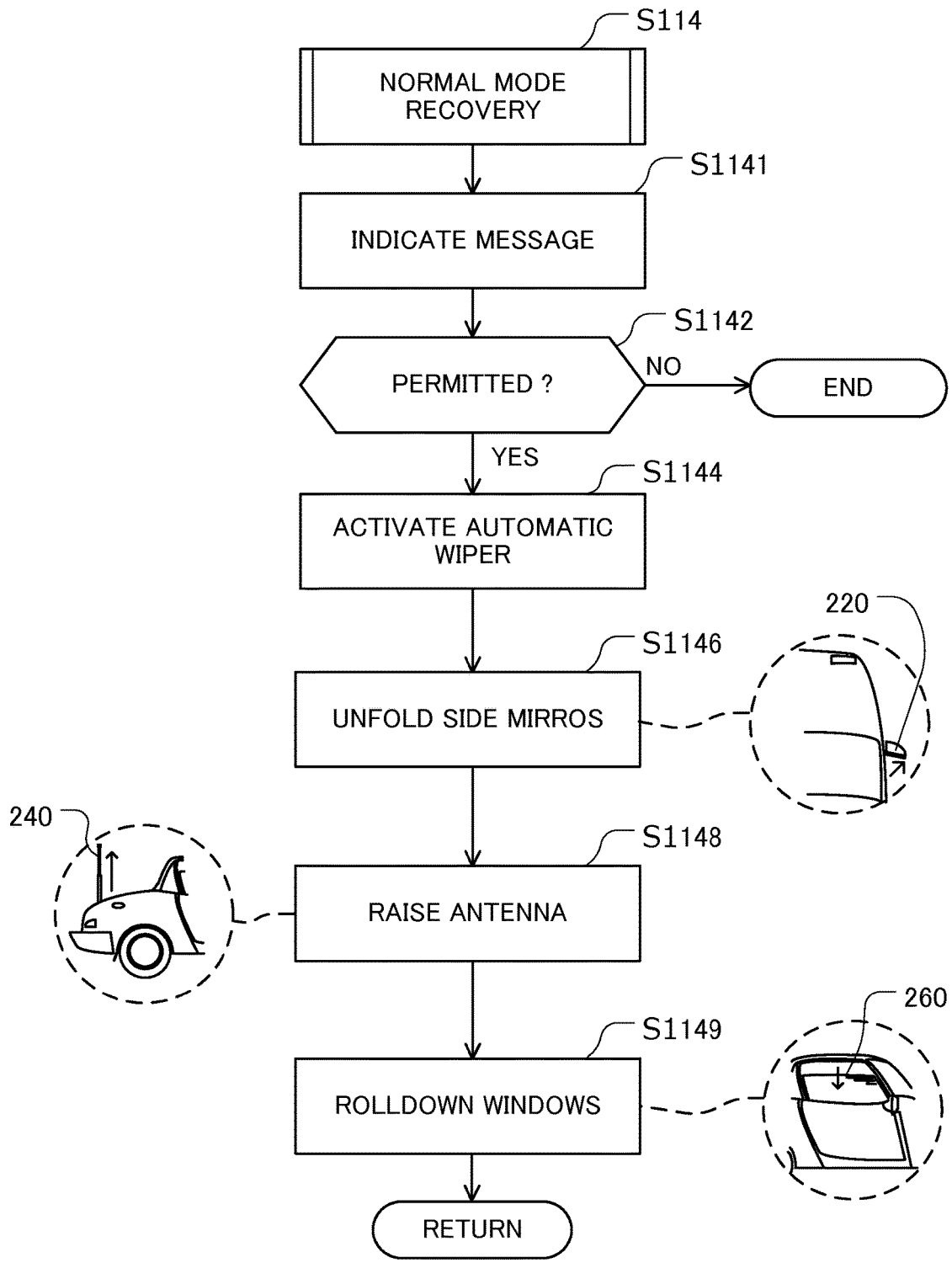
FIG. 13 is a flowchart showing a normal mode recovery.

As shown in FIG. 13, the normal mode recovery is a sub-processing branched from the main processing. In the normal mode recovery, at S1141, the in-vehicle device 10 may prompt the occupant to start a substantial operation of the normal mode recovery.

Figure 14:
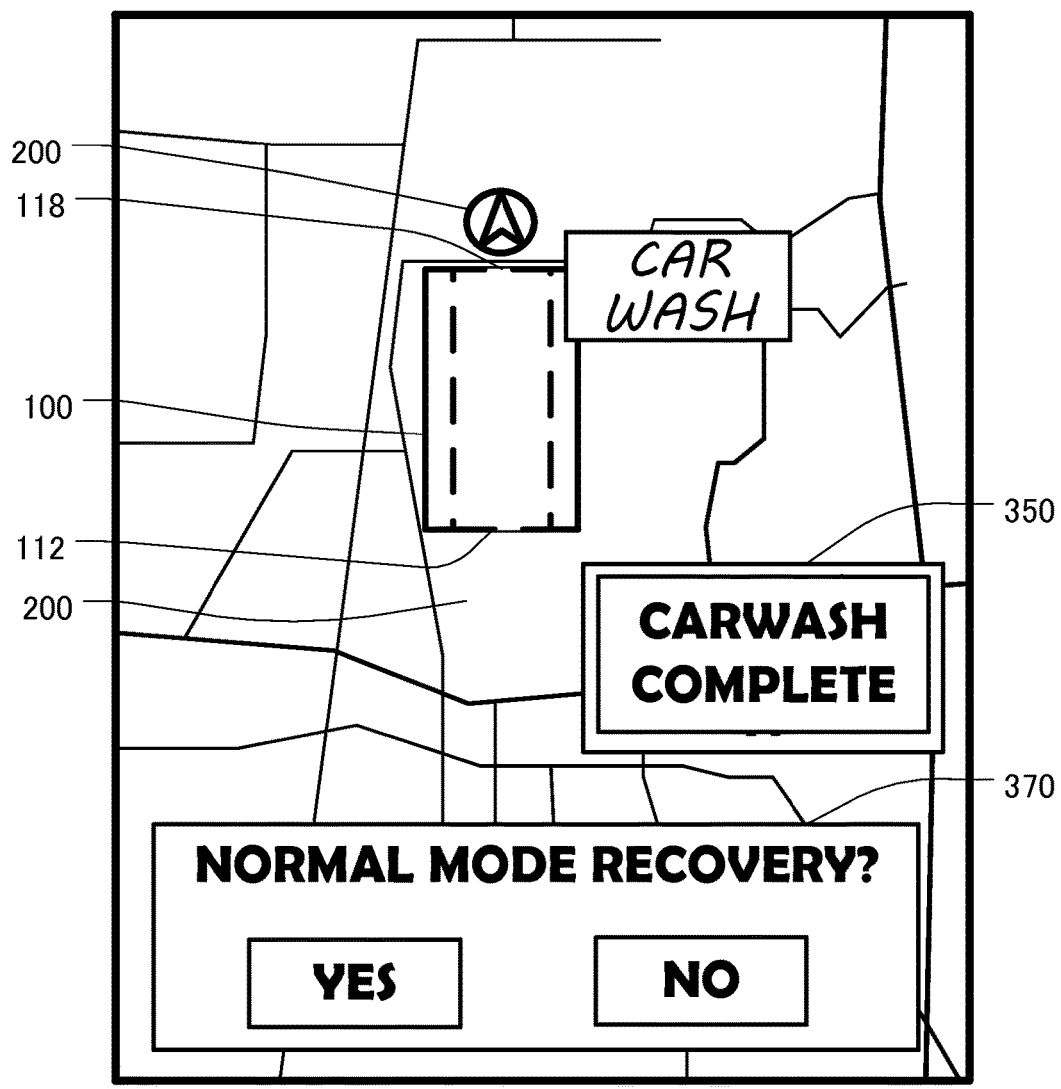
FIG. 14 is a view shown on a display device after carwash.

Specifically, as shown in FIG. 14, the in-vehicle device 10 may indicate a message 370 on the display 11 to ask the driver whether to start the normal mode recovery. Currently, the display 11 may indicate a message 350 to notify the occupant of completion of carwash. When the occupant selects "NO" by touching a NO button, the normal mode recovery terminates. When the occupant selects "YES" by touching a YES button, S1142 in FIG. 13 makes a positive determination. The in-vehicle device 10 may show this indication together with activation of the speaker to utter a voice message. The in-vehicle device 10 may obtain the response from the occupant by receiving a voice command from the occupant with the microphone.

At S1144, the in-vehicle device 10 instructs the body controller 50 to resume (activate) the automatic wiper mode. Therefore, the body controller 50 is permitted to instruct the wiper module 68 to activate the wiper in response to detection of precipitation by the rain sensor 69.

At S1146, the in-vehicle device 10 instructs the body controller 50 to cause the side mirror module 62 to unfold the side mirror 220 of the vehicle 200. In response, the side mirror module 62 activates its electric motor to drive the side mirror 220 away from the body side of the vehicle 200.

At S1148, the in-vehicle device 10 instructs the body controller 50 to cause the antenna module 64 to raise the antenna 240 of the vehicle 200. In response, the antenna module 64 activates its electric motor to raise the antenna 240 thereby to project the antenna 240 from the body.

At S1149, the in-vehicle device 10 instructs the body controller 50 to cause the window module 66 to roll down the window 260 of the vehicle 200. In response, the window module 66 activates its electric motor to roll down the window 260 thereby to lower the window 260 and to open the window 260. For example, the window module 66 may store a position of the window 260 before the carwash preparation and may restore the position of the window 260 at the stored position.

Thus, the sub-processing returns to the main processing in FIG. 3. Subsequently, the main processing terminates.

As described above, the system may use map database stored in the in-vehicle device 10 to determine if the vehicle 200 is within the predetermined distance from the carwash 100 and if the shift position is at the Neutral (N). If both condition is met, the system may implement the carwash preparation. The system may cancel the automatic wiper mode not to cause miss-detection of cleaning liquid spray in the carwash 100 as precipitation. Thus, the system may cause the wiper not to hamper cleaning of the windshield of the vehicle 200 and not to cause damage in the wiper arm, a wiper motor, and/or a wiper blade. The system may fold the side mirrors 220, lower the antenna 240, and/or rollup the windows 260 to protect those components in the carwash 100 and not to hamper cleaning of the vehicle 200.

The combination of the above-described operations in the carwash preparation is optional. In the carwash preparation, at least one of the cancellation of the automatic wiper mode, the folding of the side mirrors 220, the lowering of the antenna 240, and the rolling up of the windows 260 may be made.

Second Embodiment

The in-vehicle device 10 may have detailed information of the carwash 100, such as the entrance 112 and the exit 118. The in-vehicle device 10 may determine the positions of the entrance 112 and the exit 118 of the carwash 100.

Figure 15:
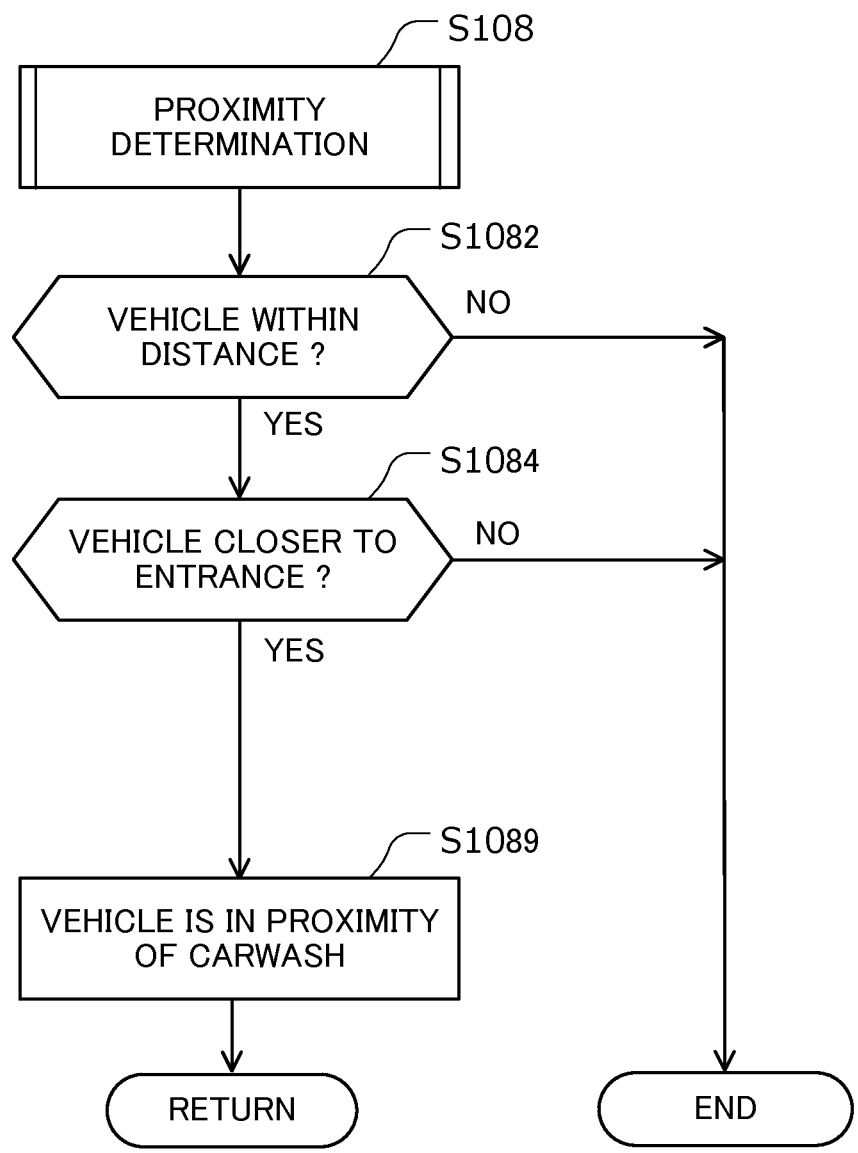
FIG. 15 is a flowchart showing a proximity determination according to a second embodiment.

In FIG. 15, the proximity determination further includes S1084 at which the in-vehicle device 10 determines whether the vehicle 200 is closer to the entrance 112 than the exit 118. When S1084 makes a positive determination, the processing proceeds to subsequent step S1089.

According to the present embodiment, when determining that the vehicle 200 is within the distance d from the carwash 100 and that the vehicle 200 is closer to the entrance 112 than the exit 118, the in-vehicle device 10 may determine that the vehicle 200 is in proximity to the carwash 100 and that the driver intends to use the carwash 100.

Third Embodiment

The in-vehicle device 10 may determine the direction of the vehicle 200 relative to the position of the entrance 112 of the carwash 100.

Figure 16:
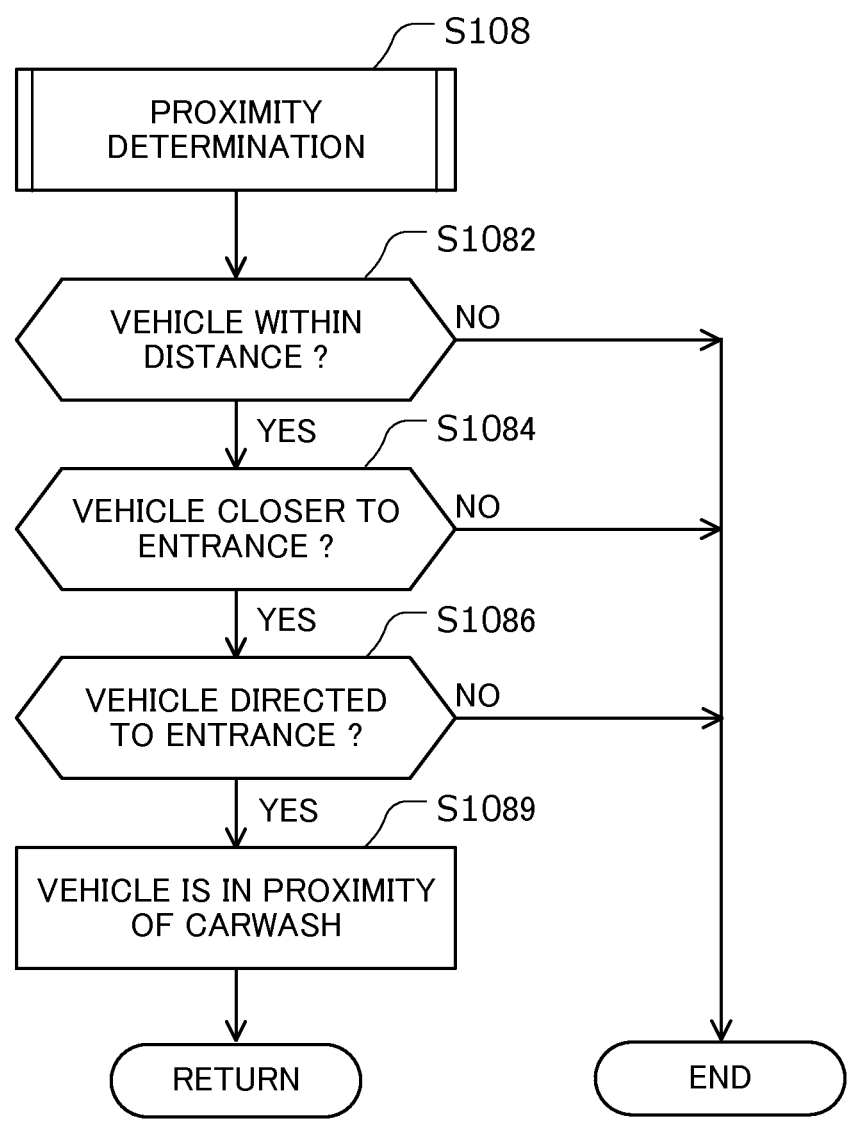
FIG. 16 is a flowchart showing a proximity determination according to a third embodiment.

In FIG. 16, the proximity determination further includes S1086 at which the in-vehicle device 10 determines whether the vehicle 200 is directed to the entrance 112 of the carwash 100. Specifically, S1086 may make a positive determination, when the entrance 112 resides in front of the vehicle 200 within a predetermined angular range relative to the center of the vehicle 200. The predetermined angular range may be 30 degrees or, more precisely, 15 degrees. When S1086 makes a positive determination, the processing proceeds to subsequent step S1089.

According to the present embodiment, when determining that the vehicle 200 is within the distance d from the carwash 100, that the vehicle 200 is closer to the entrance 112 than the exit 118, and that the vehicle 200 is directed to the entrance 112, the in-vehicle device 10 may determine that the vehicle 200 is in proximity to the carwash 100 and that the driver intends to use the carwash 100.

Fourth Embodiment

Figure 17:
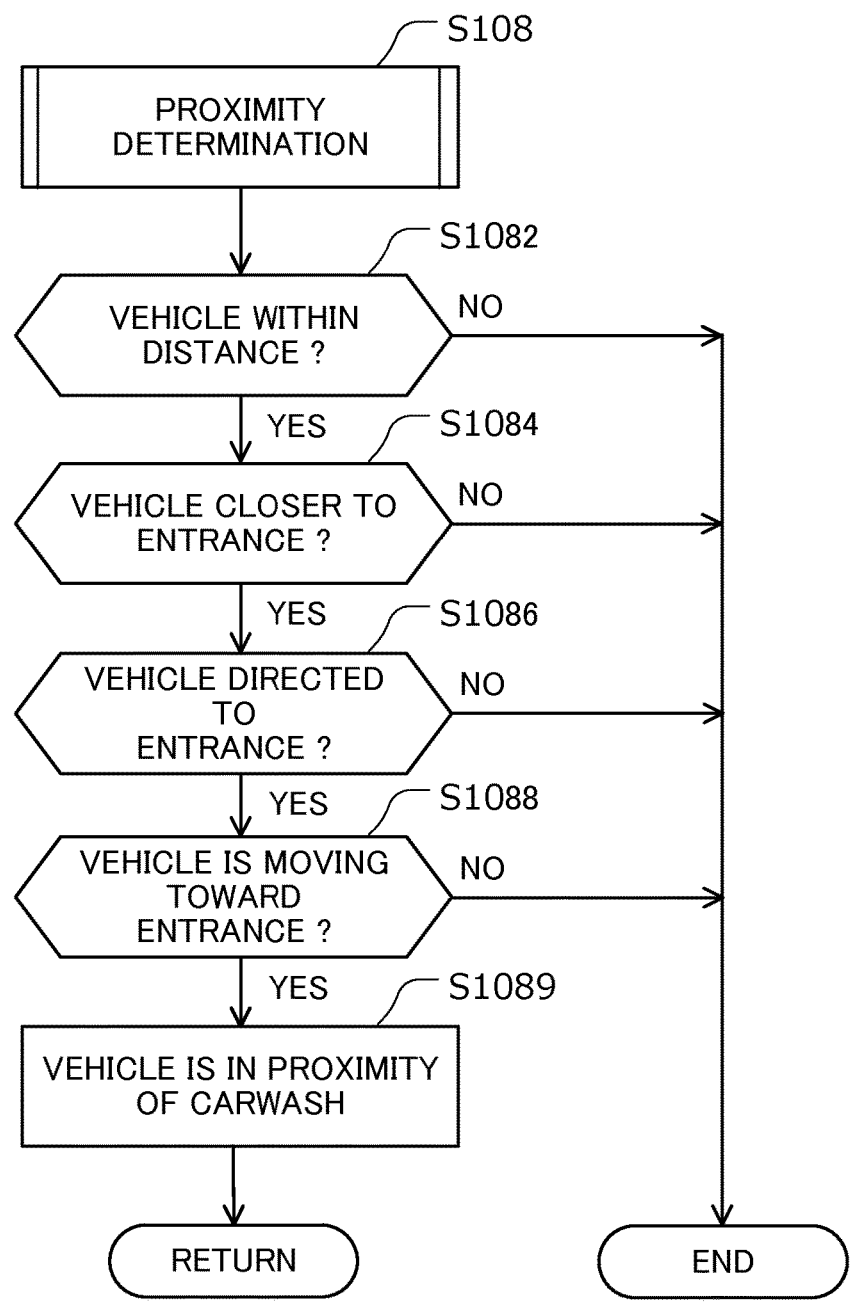
FIG. 17 is a flowchart showing a proximity determination according to a fourth embodiment.

In FIG. 17, the proximity determination further includes S1088 at which the in-vehicle device 10 determines whether the vehicle 200 is moving toward the entrance 112 of the carwash 100. The determination may be made after the vehicle 200 moves a predetermined short distance such as several meters (or 1 or 2 meters). When S1086 makes a positive determination, the processing proceeds to subsequent step S1089.

According to the present embodiment, when determining that the vehicle 200 is within the distance d from the carwash 100, that the vehicle 200 is closer to the entrance 112 than the exit 118, that the vehicle 200 is directed to the entrance 112, and that the vehicle 200 is moving toward the entrance 112, the in-vehicle device 10 may determine that the vehicle 200 is in proximity to the carwash 100 and that the driver intends to use the carwash 100.

Other Embodiment

The indication of message at S1101 and S1141 may be omitted, and the sub-processing(s) may be implemented without the prompt to the occupant. The carwash preparation and the normal mode recovery may include one of the activation/deactivation of the automatic wiper, the folding/unfolding of the side mirrors 220, the lowering/raising of the antenna 240, and the rollup/rolldown of the window 260.

The position detection may be implemented by using V2I communications between the vehicle 200 and the facility 110 (carwash 100), in addition to using the GPS device 15. In this way, accuracy of the position detection may be enhanced.

The facility 110 may detect the position of the vehicle 200 and/or entry of the vehicle 200 through the entrance 112 into the carwash 100 to provide a detection result. The vehicle 200 may receive the detection result by using the V2I communications to implement the proximity determination with reference to the detection result.

The configuration is not limited to the above embodiments and may employ various modifications. The functions and processings of the in-vehicle device 10 and the body controller 50 may be partially or entirely replaced to each other. The connections of the devices and modules are examples, and the devices may be communicated or not-communicated with the in-vehicle device 10 and/or the body controller 50 via individual control line(s) and the CAN 70.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A control device for a vehicle, the control device comprising:
   a position determination unit configured to determine whether a position of the vehicle is in proximity to a carwash;
   a shift determination unit configured to determine a shift position of a transmission device of the vehicle;
   a brake determination unit configured to determine activation of a brake device of the vehicle; and
   a control unit, wherein
   the control unit is configured to determine that a condition to implement a carwash preparation is satisfied,
   when the position determination unit determines that the position of the vehicle is in proximity to the carwash,
   when the shift determination unit determines that the shift position is in a neutral position,
   the position determination unit determines that the vehicle is in proximity to the carwash when a distance between the vehicle and the carwash is less than a predetermined distance,
   a vehicle direction determining unit configured to determine whether the vehicle is directed to the entrance, wherein the control unit is configured to determine that the vehicle is in proximity to the carwash when the vehicle direction determining unit determines that the vehicle is directed to the entrance, and
   when the brake determination unit determines that the brake device is deactivated.

2. The control device according to claim 1, wherein
   the control unit is further configured to implement the carwash preparation by implementing at least one of
   cancelling of an automatic wiper mode,
   folding of a side mirror,
   lowering of an antenna, and
   rollup of a window.

3. The control device according to claim 1, wherein the position determination unit determines that the vehicle is in proximity to the carwash when a distance between a center of the vehicle and a center of the carwash is lass than a predetermined distance.

4. The control device according to claim 1, wherein the position determination unit determines that the vehicle is in proximity to the carwash when a distance between a center of the vehicle and a periphery of the carwash is lass than a predetermined distance.

5. The control device according to claim 1, further comprising:
   a relative position determining unit configured to determine whether the vehicle is closer to an entrance of the carwash than an exit of the carwash, wherein
   the control unit is configured to determine that the vehicle is in proximity to the carwash when the relative position determining unit determines that the vehicle is closer to the entrance than the exit.

6. The control device according to claim 1, further comprising:
   a vehicle movement determining unit configured to determine whether the vehicle is moving toward the entrance, wherein
   the control unit is configured to determine that the vehicle is in proximity to the carwash when the vehicle movement determining unit determines that the vehicle is moving toward the entrance.

7. The control device according to claim 1, further comprising:
   a communication unit to communicate with a facility to retrieve information on the vehicle and information on the carwash, wherein
   the position determination unit is further configured to determine whether the position of the vehicle is in proximity to the carwash with reference to the information.

* * * * *